United States Patent [19]
Eguchi et al.

[11] 3,935,543
[45] Jan. 27, 1976

[54] LASER MODE LOCKING AND COUPLING METHOD AND APPARATUS

[75] Inventors: Ronald G. Eguchi, Torrance; Michael M. Mann, Palos Verdes Estates; William B. Lacina, Los Angeles; Kay C. Crill, Long Beach, all of Calif.

[73] Assignee: Northrop Corporation, Los Angeles, Calif.

[22] Filed: July 11, 1974

[21] Appl. No.: 487,754

Related U.S. Application Data

[63] Continuation of Ser. No. 192,583, Oct. 21, 1971.

[52] U.S. Cl. ...... 331/94.5 M; 331/94.5 C; 350/150; 330/4.3
[51] Int. Cl.² ................. H01S 3/098; H01S 3/10
[58] Field of Search ............... 331/94.5; 350/150; 330/4.3

[56] References Cited
UNITED STATES PATENTS 3,593,188  7/1971  Nussmeier ..................... 331/94.5
3,656,068  4/1972  Runge ........................... 331/94.5

OTHER PUBLICATIONS

Nash et al., IEEE J. of Quantum Electronics, Vol. QE-4, No. 1, Jan., 1968, pp. 26–34.
DiDomenico, Jr., J. of Applied Physics, Vol. 35, No. 10, Oct., 1964, pp. 2870–2876.
Mann et al., Applied Physics Letters, Vol. 17, No. 9, pp. 393–395, 1 Nov. '70.

*Primary Examiner*—Robert J. Webster
*Attorney, Agent, or Firm*—Edward A. Sokolski

[57] ABSTRACT

A single electrooptic crystalline material, having a first pair of electrodes affixed thereto along opposite faces, and a second set of electrodes affixed to alternate opposite faces, is disposed within a laser cavity. The orientation of the crystal and selection of electrode faces is such that the application of two different electric fields can achieve simultaneous mode-locking of the laser with output coupling of the optical pulses.

8 Claims, 6 Drawing Figures

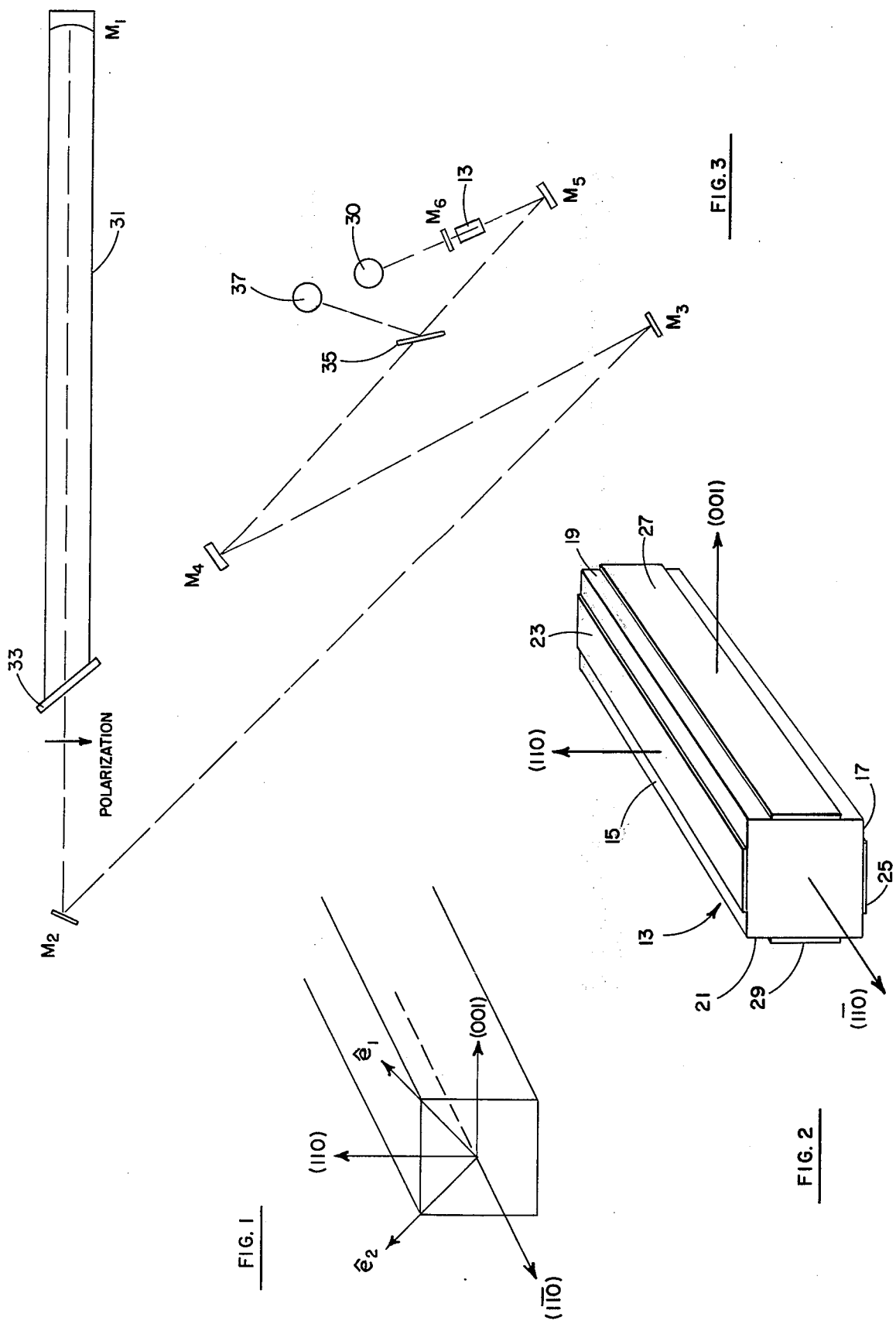

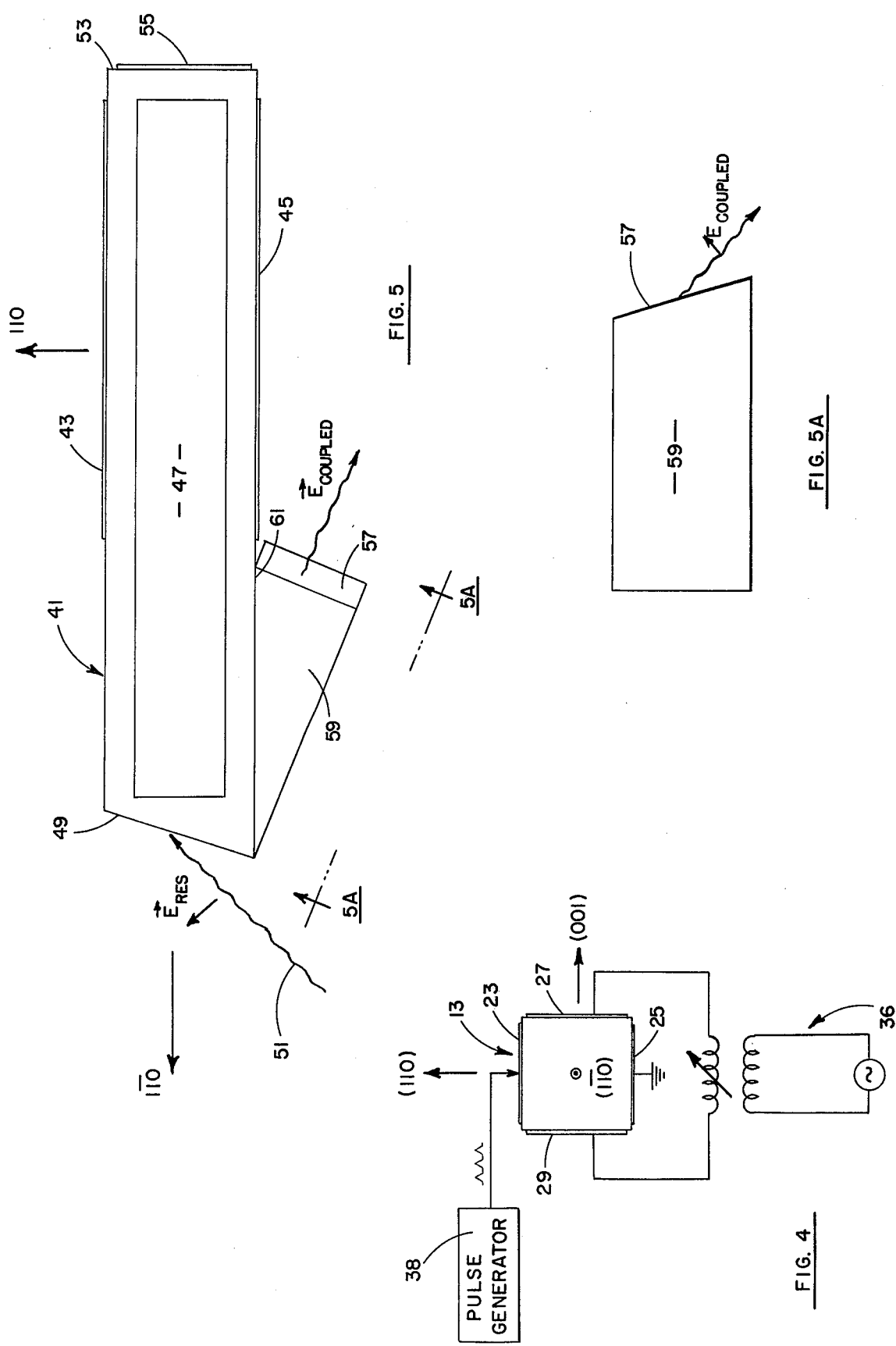

LASER MODE LOCKING AND COUPLING METHOD AND APPARATUS

The invention described herein was made in the course of a contract with the Office of Naval Research, Navy Department of the United States.

This is a continuation of application Ser. No. 192,583 filed Oct. 21, 1971.

BACKGROUND OF THE INVENTION

This invention is concerned with a means for achieving internal (i.e., intracavity) mode-locking and modulation of an optical laser device. More particularly, the invention relates to a method for accomplishing simultaneous intracavity mode-locking and pulse output coupling of a laser device, using a single electrooptic crystal disposed within the laser resonator cavity. The ability to generate stable trains of optical pulses of short time duration at high repetition rates, and to couple them singly or in some desired sequence from the laser cavity, offers several useful applications for optical communication or radar systems or possibly for laser-induced nuclear fusion. In the context of communication theory, information can be "coded" onto the optical beam by controlling the sequence by which pulses are turned off or on, and there are several advantages which the present technique possesses for laser systems operating in the far infrared. For optical radar applications, the ability to generate pulses of short time duration permits improvement in resolution and determination of the target shape. For laser-induced fusion, it is important to be able to produce short pulses of high energy.

The frequencies of the axial modes of a laser cavity are determined by the condition that an integer number of optical half-wavelengths must fit into the cavity length $L$, so that the frequency difference is $c/2L$, where $c$ is the velocity of light. Mode-locking is a process by which the axial modes of a laser cavity can be induced to oscillate with their phases "locked" together in such a way that the optical field in the laser consists of a single pulse travelling back and forth in the cavity. Aside from spontaneous (or passive) locking, which can sometimes occur due to nonlinear interactions in the laser gain medium, there are two basic active methods for achieving laser mode-locking. Both require the introduction into the laser cavity of a time-varying perturbation with frequency tuned near a value that is a multiple of the laser axial mode difference frequency. Only modes which have sufficient gain in the laser medium to overcome the losses in the laser resonator will be able to oscillate. It is only these modes, and perhaps some whose gain is slightly below threshhold for oscillation, that can be driven to oscillate with their phases locked together to form a sharp optical pulse in active mode-locking schemes.

The first type of active mode-locking technique is AM locking, or loss-locking, since it involves an amplitude modulation of the optical modes. This form of mode-locking is achieved by the introduction of a time-varying loss into the laser cavity, and for simplicity, this loss could be imagined to be a very fast shutter or chopper which is being opened and closed with a frequency equal to the axial mode frequency difference. Since this frequency difference (which is $c/2L$) corresponds to the frequency at which light can traverse a round-trip of the cavity, only an optical pulse timed to coincide with the times when the shutter is open can build up in the laser. This, of course, represents a simplified picture of loss-locking. In general, a wide variety of methods can be employed to introduce a time-varying amplitude perturbation mechanism into a laser cavity, in order to induce a locking of the phases of the modes in such a way that an optical pulse is produced that travels back and forth in the cavity to coincide with times when the loss is minimized. For example, AM locking can be achieved by means of an electrooptic crystal. In effect, this arrangement provides for an electrooptic shutter that allows only a pulse with the proper synchronization to build up in the cavity.

The other type of mode-locking is called FM locking, or phase locking. This type of mode-locking can, for example, be achieved by moving one of the mirrors of the laser mechanically back and forth, with the axial mode difference frequency. If a pulse strikes the mirror during movement, the frequency, and thus the phase, of the light will be shifted, and the pulse will never be able to build up in the laser cavity. The only pulses that can build up are those that strike the mirror at either end of its excursion, since at those times, the mirror is instantaneously stationary and will produce no Doppler frequency shift in the reflected light beam. The same effect can be achieved by utilizing an electrooptic crystal and varying its refractive index by means of an applied electric field. An electric field applied to an electrooptical crystal produces a change in the optical index of refraction, and the phase velocity of light in the medium is equal to $c/n$, where $c$ is the velocity of light in vacuum and $n$ is the index of refraction of the material. Thus, by means of a variable applied electric field, it is possible to modulate the phase velocity of light in the electrooptic material. In effect, by varying the voltage applied to the crystal, the phase of the light is shifted as it propagates through the crystal, except at the extremes of the perturbation. If the voltage is applied at a frequency near a multiple of the axial mode difference frequency (which is $c/2L$), pulses can build up in the cavity if they coincide with the times when the perturbation is at one of its extrema. FM locking is preferable to AM locking, since it is more stable in the presence of loss modulation or coupling.

The technique of mode-locking with an electrooptic crystal has been previously demonstrated. Furthermore, the technique of inducing birefringence in an electrooptic crystal for pulse output coupling has also been previously employed. To utilize an electrooptic crystal for pulse coupling (dumping), the beam is first linearly polarized (with a Brewster window, for example). A pair of electrodes placed on the electro-optic crystal, which is disposed within the laser cavity, allows an electric field to be applied, which induces a birefringence in the crystal. (Induced birefringence means that the crystal is made double-refracting.) When linearly polarized light passes through a birefringent crystal, the transmitted beam can become elliptically polarized. If a second polarization selective element is placed in the laser cavity, it will reflect out of the cavity a fraction of the elliptically polarized beam. This causes part of the optical pulse to be coupled out (or dumped) from the laser cavity. Such an arrangement is disclosed, for example, in U.S. Pat. No. 3,508,164 to Uchida.

The presence of separate intracavity elements for mode-locking and pulse-dumping introduces optical complexity, and is also undesirable because both elements represent a source of loss.

SUMMARY OF THE INVENTION

As used herein, the term laser refers to both solid state or gaseous laser systems--the present invention is not restricted to any particular type of laser material. It has been found that a single electrooptic crystal element can be disposed within the cavity of the laser in such a manner that the crystal can simultaneously provide both mode-locking and pulse dumping of the laser. Briefly, this is accomplished by proper orientation of the crystal and choice of optical polarization so that the necessary electric fields for phase-locking and output coupling can be provided by two sets of electrodes on four opposing faces. The polarization direction of the optical field, as well as crystallographic symmetry conditions, determine the orientation of the crystal and the electrode configuration. The first set of electrodes, affixed to opposite faces, is used for an a.c. electric field to induce the mode-locking, while the second set, affixed to alternate opposite faces, is used for an electric pulse (or coded sequence of such pulses) to achieve pulse dumping. In other words, electrodes are applied to faces of the crystal with simultaneous signals applied thereto, whereby the electrooptic crystal simultaneously mode-locks and pulse couples the laser. A typical crystal material is gallium arsenide (GaAs) employed in a $CO_2$ laser. The first pair of electrodes are deposited on the 001 faces of the crystal to produce mode-locking. A second pair of electrodes is deposited on the 110 faces of the crystal (which are orthogonal to the 001 faces), so that when an electric field is applied between them, pulse-coupling will be achieved. It is believed that a better understanding of the invention can be obtained from the following drawings and more detailed description.

BRIEF DESCRIPTION OF THE DRAWINGS

FIG. 1 is a perspective view of the modulator configuration employed to demonstrate this invention, and shows the orientation of the crystal axes relative to the optical axis of the laser cavity, which is along the 110 direction.

FIG. 2 is a perspective view of the modulator configuration, showing the configuration of electrode pairs on orthogonal faces to achieve simultaneous mode-locking and pulse output coupling.

FIG. 3 is a schematic view of the folded laser resonator cavity which was designed to demonstrate this invention.

FIG. 4 is a schematic diagram of the resonator circuit that was employed for the mode-locking, with the electrical pulse signal for output coupling also indicated.

FIG. 5 is a schematic view of a modulating crystal cut with Brewster angles to achieve the embodiments of this invention.

FIG. 5a is an auxiliary figure taken at line 5a—5a.

DESCRIPTION OF THE PREFERRED EMBODIMENTS

As is well known, an externally applied electric field can induce a birefringence in the optical refractive index of a crystalline medium. For a crystal lacking inversion symmetry, this is the linear electrooptic effect and the change in refractive index is proportional to the applied field. An induced birefringence will lead to phase retardations and/or elliptical polarization of a light beam propagating through the medium. As a result, the electro-optic effect can be exploited for a wide variety of optical modulation, mode locking, and pulse dumping schemes. Preferably, the electrooptic modulator material should have high electrical resistivity, large non-linear coefficient, small absorption losses and a high refractive index. Furthermore, since the birefringence induced in the refractive index per unit electric field strength is typically very small, long crystals of good optical quality are usually necessary in order to produce adequate phase retardations. In the specific embodiment described herein and with particular regard to the explanation of the experimental geometry, a gallium arsenide crystal is utilized. Gallium arsenide is transmissive in the infrared spectral range and thus can be utilized with a $CO_2$ laser. It should be understood that other materials which are transmissive in the visible light range would be required for lasers that emit visible wavelengths. Such electrooptic materials would include $LiNbO_3$, for example. The following mathematical analysis based on the theory of the electrooptic effect as particularly related to gallium arsenide will be utilized to show the effect herein achieved of simultaneous mode-locking and pulse dumping with a single crystal.

The nonlinear polarization $P^{NL}(\omega_2=\omega_1+\omega_0)$ induced by the interaction of two electric fields $E(\omega_1)$ and $\epsilon(\omega_0)$ is given by $P_i^{NL}(\omega_2) = d_{ijk}(\omega_2,\omega_1,\omega_0) E_j(\omega_1)\epsilon_k(\omega_0)$, where, for GaAs, the susceptibility tensor d has components which vanish unless $(ijk)$ is a permutation of $(xyz)$. All non-zero coefficients have the value $d = 1.85 \times 10^{-7}$ esu, and can be assumed to be independent of $\omega$. Thus, $P_x^{NL}(\omega_2) = dE_y(\omega_1)\xi_z(\omega_0) + dE_z(\omega_1)\xi_y(\omega_0)$
$P_y^{NL}(\omega_2) = dE_z(\omega_1)\xi_x(\omega_0) + dE_x(\omega_1)\xi_z(\omega_0)$
$P_z^{NL}(\omega_2) = dE_x(\omega_1)\xi_y(\omega_0) + dE_y(\omega_1)\xi_x(\omega_0)$.

If $\xi(\omega_0)$ represents an applied modulation field, and $E(\omega_1)$ an optical field then a nonlinear polarization at an optical frequency $\omega_2 = \omega_1 + \omega_0$ will be induced. Assume that $\omega_0$ is chosen to be the axial-mode frequency separation of two simultaneously oscillating laser cavity modes of equal amplitude, with frequencies $\omega_1$ and $\omega_2$:

$E(\omega_1) = E \exp(i\omega_1 t)$
$E(\omega_2) = E \exp(i\omega_2 t)$

Then an effective dielectric tensor for $\omega_2$ that accounts for both linear dispersion and the nonlinear electrooptic effect would be given by $$\epsilon_{eff}(\omega_2) = \epsilon_0 + 4\pi d \begin{pmatrix} 0 & \xi_z & \xi_y \\ \xi_z & 0 & \xi_x \\ \xi_y & \xi_x & 0 \end{pmatrix}$$

and similarly for $\omega_1$. The unperturbed dielectric tensor $\epsilon_0$ is just a constant, $\epsilon_0(1)$, and will be assumed to be independent of the frequency $\omega$. The eigenvectors of $(1 - \kappa\kappa) \epsilon^{-1}(\omega)$ determine the polarization directions of the optical modes which can propagate in the crystal, and the corresponding eigenvalues are the values of $1/n^2$. Thus, since $d$ is small, $$\epsilon_{eff}^{-1} \approx \epsilon_0^{-1} \left[ 1 - (4\pi d/\epsilon_0) \begin{pmatrix} 0 & \xi_z & \xi_y \\ \xi_z & 0 & \xi_x \\ \xi_y & \xi_x & 0 \end{pmatrix} \right]$$

Consider a crystal of GaAS oriented so that the cavity-mode fields $E(\omega_1)$ and $E(\omega_2)$ are polarized along (110), with a propagation direction along (110), and with an applied field $\xi(\omega_0)$ in the (001) direction. Then $$\epsilon_{eff}^{-1} \approx \epsilon_0^{-1} \left[ 1 - (4\pi d\xi/\epsilon_0) \begin{pmatrix} 0 & 1 & 0 \\ 1 & 0 & 0 \\ 0 & 0 & 0 \end{pmatrix} \right]$$

and this tensor has eigenvectors (110), (1̄10), and (001), with corresponding eigenvalues:

$1/n_1^2 = \epsilon_o^{-1}(1 - 4\pi d\xi/\epsilon_o)$
$1/n_2^2 = \epsilon_o^{-1}(1 + 4 = d\xi/\epsilon_o)$
$1/n_3^2 = \epsilon_o^{-1}$ Since these are also eigenvectors of $(1 - \kappa\kappa)$, they represent aigenvectors of $(1 - \kappa\kappa)^{-1}(\omega)$, and thus determine the new modes of propagation in the crystal in the presence of the field $\xi$. Since the cavity modes were initially assumed to be polarized along (110), the effect of the driving field $\xi(\omega_o)$ is to phase modulate the optical fields, but not to introduce elliptical polarization, since (110) still remains an eigenmode for propagation with $n^2 = (\epsilon_o + 4\pi d\xi)$. Thus, a field applied on (001) with a frequency $\omega_o$ tuned to the axial mode separation can be used to lock cavity modes polarized along (110) by intracavity phase perturbation, and it will not rotate the plane of polarization.

Next, suppose the field $\xi_o$ is a dc field applied along (1̄10). Then the effective dielectric tensor for the cavity modes (at frequency $\omega_1$ or $\omega_2$) is $$\epsilon_{eff} = \epsilon_o + (4\pi d\xi_o/ \quad 2) \begin{pmatrix} 0 & 0 & 1 \\ 0 & 0 & 1 \\ 1 & 1 & 0 \end{pmatrix}$$

The eigenvectors of $\epsilon_{eff}^{-1}$, with the corresponding eigenvalues for refractive index, are easily shown to be $e_1 = (1/2, 1/2, 1/\quad 2) \quad n_1^2 = \epsilon_o + 4\pi d\xi_o$
$e_2 = (1/2, 1/2, -1/\quad 2) \quad n_2^2 = \epsilon_o - 4\pi \; d\xi_o$ As shown in FIG. 1, the application of a field $\xi_o$ along (1̄10) results in a new set of eigenmodes rotated 45° from the crystal directions (001) and (110). Thus, for cavity modes polarized along (110), there will be an elliptical polarization produced by the field $\xi_o$. That is, the original cavity modes $E(\omega)$ can be decomposed into two components referred to the new set of polarization modes $e_1$, $e_2$, and each of these components will propagate with different phase velocities in the crystal. This will produce an elliptically polarized optical field. The amplitude of the component of the field polarized orthogonal to the input will depend upon the length of the crystal and the magnitude of the applied field. If the optical field propagating in the crystal is written as $E(r, t) = (E\,e^{-i\quad t/} \quad 2)\, e_1\, e^{ik_1 \cdot r} + e_2\, e^{ik_2 \cdot r}$ then $E(0, t)$ will be initially polarized along (110). Since $k_1 = n_1\omega/c$, $k_2 = n_2\omega/c$, one has $(k_1 + k_2) = 2k$, and the field $E(r,t)$ can be written more simply as $E(r, t) = (E/\quad 2)\,\exp\,(-i\omega t + ik \cdot r)\, x$
$e_1\,\exp\,(i\Delta k \cdot r/2) + e_2\,\exp\,(-i\Delta k \cdot r/2)$, where $\Delta k = k_1 - k_2$. Thus, it is sufficient to consider only the amplitude of the wave as it travels through the crystal, and supress the phase factor $\exp(-i\omega t + ik \cdot r)$:

$E(r) = (E/\quad 2)\, e_1\,\exp\,(i\Delta k \cdot r/2) + e_2\,\exp\,(-i\Delta k \cdot r/2)$.

At any distance $r$ in the medium, the component of the field $E(r)$ along (110) is given by $E\,\cos\phi = E\,(e_1 + e_2)\quad 2 = E\cos(\Delta k \cdot r/2)$, so that the angle $\phi$ can be expressed as $\phi = \Delta k \cdot r/2 = \omega l\Delta n/2c$, where $\Delta n = n_1 - n_2 = 4\pi d\xi_o/n_o$. If the static field $\xi_o$ is denoted by $\xi_o = V_o/t$, where $V_o$ is the applied voltage and $t$ the crystal thickness, then $\phi = \pi l V_o n^3_o r_{41}/(2\lambda_o t)$ where the electrooptic coefficient $r_{41} = 8\pi d/n^4_o$ has been introduced, and $\lambda_o$ is the free-space wavelength. Thus, if a polarization selector such as Brewsterplate is used to couple out a pulse which has made a double pass through a crystal of length $l$, the total reflected power is, apart from geometric factors, proportional to $\sin^2(2\phi)$.

It has been successfully demonstrated at NCL that it is possible to simultaneously mode-lock the $CO_2$ laser by intracavity phase perturbation and to output couple the pulses by polarization dumping. The technique employs a GaAS modulator with two sets of electrodes: a field of frequency $\omega_o$ is applied along (001), and mode-locked pulses are coupled out by a dc pulsed field applied along (1̄10). The geometry of the modulator is shown in FIG. 2. The fraction power that is coupled out by reflection at the Brewster plate of index $n$ is $$P_{out}/P_o = \frac{n^2-1}{n^2+1}^2 \sin^2\,(2\phi).$$

A similar analysis to that described above can be carried out for other crystal symmetries if a different modulator material is used.

Turning particularly to FIG. 2, there is seen a crystal 13 of gallium arsenide which has been rectangularly cut to provide faces 15 and 17 along the 110 planes and faces 19 and 21 along the 001 planes orthogonal to the 110 planes. A pair of electrodes 23 and 25 are applied to the faces 15 and 17 respectively. The electrodes are made of silver paint or similar conductive material in the form of thin foil or plates. Suitable electric leads are then connected to the plates in order to apply the desired dumping electrical field within the crystal between the plates. Likewise, a second pair of plates 27 and 29 are affixed to corresponding faces 19 and 21 in the 001 planes of the crystal. It can now be understood that the plates 23 and 25 are utilized to apply a dumping field across the 110 direction of the crystal to achieve pulse coupling, while the plates 27 and 29 are used to induce a perturbation in the crystal for modelocking. A $CO_2$ laser was utilized for demonstrating the present invention. The laser configuration consisted of a discharge tube 31 having 40 mm internal diameter and 6 meter length. The tube 31 was utilized in a 22 meter folded optical resonator utilizing mirrors $M_1$–$M_6$. This provided an axial-mode separation of 6.8 MHz. The laser output from a 2% transmitting output mirror $M_6$ was monitored with a liquid-helium-cooled Ge:Cu detector 30. The gallium arsenide crystal 13 utilized had dimensions of 3 × 3 × 50 mm, having electrodes disposed as shown in FIG. 2. The optical field was polarized along the 110 direction by a sodium chloride Brewster window 33 on the discharge tube 31. The crystal was resonated in a parallel LC circuit with high Q (about 300) at a frequency corresponding to the driver frequency. The modulator resonator circuit was inductively coupled to a tunable rf driver 36 as shown in FIG. 4. Under typical laser operating conditions, a 10-torr mixture of 4.5% $CO_2$; 12.0% $N_2$; and 83.5% He was used, with a discharge current of 20 mA.

With the rf driver tuned to the fundamental axial-mode frequency, stable locking was obtained with a signal as small as 0.5V peak-to-peak from the modulator driver. This corresponded to a modulator drive power of 1 mW. Under these conditions, pulses with Gaussian profiles 40 nsec wide with a 140 nsec period were observed. Increasing the signal to 10 V peak-to-peak decreased the pulse duration to 25 nsec. Further increase in the applied voltage produced a gradual sharpening of the pulse form. The average power in the locked mode of operation was 94% of the cw power. These results are consistent with observations of the rf spectral characteristics of the detector output which indicated that five to six modes were locked. In other words, as the drive voltage increased, the number of modes locked also increases while the pulse becomes narrower. To demonstrate the wide range of detuning available with the present invention to achieve mode locking, the modulation frequency was increased and decreased. It was found that stable locking could be induced when the modulation frequency was within a range of − 75 kHz to + 170 kHz of the fundamental axial-mode frequency of 6.8 MHz. In each case the modulator resonator circuit was tuned to the drive frequency. The drive voltage required to obtain locking at the extremes of the tuning range was approximately 20 times as great as that required for zero detuning.

The aforegoing discussion related to the description of the mode locking achieved utilizing the gallium arsenide crystal in a $CO_2$ laser. In the arrangement shown in FIG. 3, the optical field was polarized along the 110 directions of the crystal in the absence of a coupling signal. Coupling of a single laser pulse or sequence of pulses was affected by applying a voltage pulse on the 110 faces as shown in the diagram of FIG. 4 to induce a birefringence in the gallium arsenide crystal in a manner previously described. The resultant optical component polarized along the 001, axis was coupled out of the resonator by a polarization analyzer 35 in the form of a germanium flat oriented at a Brewster angle. A liquid-nitrogen-cooled Ge:Au detector 37 was employed, and power measurements were made with a calibrated thermopile. The peak intracavity pulse power in mode-locked operation was 2 kW. A pulse generator 38, as shown in FIG. 4, provided a square wave pulse at an amplitude of 440 V to achieve output coupling. The measured cavity coupling coefficient was about 3%. The effect of increasing the coupling pulse power was indicated by observing the pulse trains through the 2% end mirror $M_6$, using detector 30. Various readings were taken with a coupling factor up to 25%. It was found that the stability of the mode locking was unaffected by the coupling, even when the coupling was increased to a point where laser oscillation was nearly extinguished.

Turning now to FIG. 5, there is seen a schematic view of an embodiment of this invention wherein a specially constructed crystal element 41 has been provided for coupling the desired energy. The crystal 41 has a first set of electrodes 43 and 45 applied to the 110 faces for applying the coupling modulation, and a second pair of electrodes (one of which, 47, is seen in the view) applied to the 001 faces for mode-locking. It should be pointed out, however, that the presently described crystal design is particularly adapted for coupling and need not simultaneously be utilized for mode locking. Thus, the electrodes applied to the 001 faces are not a requirement except where the concept of the present invention involving the simultaneous mode locking and phase coupling is desired. One face 49 of the crystal is cut so that laser radiation 51 incident on face 49 at the Brewster angle, is refracted at such an angle, so as to cause propagation of the optical field in the crystal along the 110 direction. The electrical output coupling field applied along the 110 faces will remain on long enough for a mode-locked pulse in the cavity to make a round trip pass through the crystal. The rear face 53 of the crystal is cut perpendicular to the cavity axis with a mirror 55 deposited on its face. If the end of the modulator crystal were not terminated by such a cavity mirror 55, part of the mode-locked pulse would be partially reflected upon return for a second pass through the crystal. The magnitude of the applied pulse-coupling field is adjusted to rotate the polarization by 90°, with final coupling output taken from internal reflection off the Brewster face 49. A second Brewster face 57 for the exit pulse is provided on a small section of crystal 59 which is optically bonded to the main modulator crystal 41 to prevent total internal reflection at the lower 110 face 61. One of the further particular advantages of the novel crystal arrangement of FIG. 5 is that the crystal does not have to have anti-reflective coatings applied to the ends thereof. By providing the crystal with the Brewster face 49 and allowing the light to be coupled out through the second Brewster face 57 in accord with the arrangement shown, light is allowed only to exit as desired when the coupling pulse is applied. In the past, it has been difficult to apply and maintain the anti-reflective coatings on the end crystal surfaces. Deterioration of the coatings or lack thereof causes energy loss within the laser and is obviously quite undesirable. Though the above description related to maximum coupling, it should be understood that reduced coupling, which is useful for modulation, can be effected at lower voltage.

The particular crystal utilized in FIG. 5 was gallium arsenide and the explanation of the configuration pertained to applying modulation signals to the 110 and 001 orthogonal crystal faces in the manner previously described herein. As has been indicated, the concept of this invention is applicable to virtually any electrooptic crystal. The particular faces of a crystal to which pulse coupling and modulation signals are to be applied can be determined by an analysis that comprises simple crystallographic symmetry considerations.

We claim:

1. The method of simultaneously mode-locking a laser beam and pulse coupling a portion of said laser beam outside of the resonant optical path of said beam, comprising:
    linearly polarizing said beam,
    disposing a single electrooptic crystal element in a laser cavity, said crystal having at least two pairs of opposed faces,
    applying an electrical signal to a first pair of opposed faces of said crystal to induce a perturbation in the crystal for locking modes of oscillation of said laser beam,
    applying an electrical signal to a second pair of opposed faces of said crystal for inducing birefringence in the crystal so as to elliptically polarize the beam, and
    coupling a portion of the elliptically polarized beam outside of the resonant optical path.

2. In a laser having a lasing medium disposed within a cavity for generating a beam of electromagnetic energy and providing a resonant optical path for said beam, the improvement which comprises:
    means for linearly polarizing said beam, a single electrooptic element having at least two pairs of opposed faces, said element being disposed in the path of said polarized beam such that the beam passes between both of said pairs of faces, means for applying a first electrical signal between a first pair of said faces to induce a perturbation in said element so as to lock modes of oscillation of the beam, means for applying a second electrical signal between the second pair of said faces to elliptically polarize said beam, and means disposed in the path of the elliptically polarized beam for coupling a portion of said beam outside of the resonant optical beam path.

3. The device of claim 2 wherein said element is an electrooptic crystal, and wherein said second electrical signal operates to induce birefringence in said crystal.

4. The device of claim 2 wherein said means for applying said first electrical signal is a radio frequency signal and said second electrical signal is a pulsed DC signal.

5. The device of claim 3 wherein said first and second pairs of faces are orthogonal to each other.

6. The device of claim 5 wherein said crystal is gallium arsenide, said first and second pairs of faces being 001 and 110 faces of the crystal respectively.

7. The device of claim 3 wherein said crystal is an elongated element having a first end face which is at a non-perpendicular angle with respect to at least one of said pairs of opposed faces and a second end face at an end of said crystal opposite to that of said first end face which is perpendicular to both of said pairs of opposed faces, said crystal being oriented such that the beam is incident on said non-perpendicular face at the Brewster angle, and an additional crystal portion which is index matched to said crystal and is affixed to said crystal at said first end face thereof, said additional portion being positioned to receive the optical field reflected by said first end face and having a Brewster angle face to transmit out of said additional portion the optical field received thereby, said means for coupling a portion of said beam outside of the resonant optical beam path comprising said first end face and said additional crystal portion.

8. The device of claim 7 and further including a reflective mirror deposited on said second end face, said mirror providing one of the end mirrors for forming said optical beam path.

* * * * *